United States Patent [19]

Powers

[11] Patent Number: 5,542,287

[45] Date of Patent: Aug. 6, 1996

[54] PORTABLE GAS PRESSURE MONITOR WITH INDEPENDENTLY ADJUSTABLE HIGH AND LOW SET POINTS

[75] Inventor: Robert D. Powers, Shorewood, Ill.

[73] Assignee: Northern Illinois Gas Company, Aurora, Ill.

[21] Appl. No.: 323,633

[22] Filed: Oct. 17, 1994

[51] Int. Cl.$^6$ .................................................. G01M 3/28
[52] U.S. Cl. ........................................ 73/40.5 R; 340/626
[58] Field of Search .................................. 340/626, 611, 340/614, 384.1; 73/40.5 R, 37, 49.1, 707, 714, 756

[56] References Cited

U.S. PATENT DOCUMENTS

| | | | |
|---|---|---|---|
| 4,091,658 | 5/1978 | Covington et al. | 73/40.5 R |
| 4,100,537 | 7/1978 | Carlson | 340/626 |
| 4,187,842 | 2/1980 | Schreiber | 340/626 X |
| 4,598,279 | 7/1986 | Nowacki et al. | 340/626 |
| 4,990,894 | 2/1991 | Loescher et al. | 340/626 X |
| 5,057,822 | 10/1991 | Hoffman | 340/611 |
| 5,230,563 | 7/1993 | Shalvi | 374/141 |

*Primary Examiner*—Michael J. Brock
*Attorney, Agent, or Firm*—Emrich & Dithmar

[57] ABSTRACT

A portable gas pressure monitor includes a pressure sensor which may be coupled to a pipeline tap downstream of a work area, and first and second comparator circuits receiving the signal from the pressure sensor and comparing the pressure signal with a low pressure set point and a high pressure set point. The two set points define a safe range for the pressure of the gas being monitored. If the sensed gas pressure falls below the low set point one audible signal is generated, and if the sensed pressure exceeds the high set point, a distinctly different audible signal is generated, thus immediately and unequivocally alerting operating personnel of the nature of any alarm. The pressure is also displayed for the operator.

1 Claim, 2 Drawing Sheets 5,542,287

PORTABLE GAS PRESSURE MONITOR WITH INDEPENDENTLY ADJUSTABLE HIGH AND LOW SET POINTS

FIELD OF THE INVENTION

The present invention relates to a monitor for sensing gas pressure; and more particularly, it relates to a portable monitor designed for use in a natural gas pipeline system, for example, in monitoring system pressure downstream of a work area.

BACKGROUND OF THE INVENTION

A typical system for natural gas includes a large network of interconnected, sealed conduit (i.e., pipeline) and a series of pressure reducers for conveying the gas from a storage facility or source, usually under a relatively high pressure, to individual customers, usually at lower pressure. Throughout a large commercial natural gas pipeline system there may be a number of different operating pressure ranges for the gas according to the overall design of the system. By way of example, the system could include a storage field system, which operates at very high pressure (in the range of 500–1,000 PSI), or a transmission system, which operates over longer distances and might have a high pressure (in the range of 150–500 PSI or at 7" W.C.) or a customer-owned system which operates at low pressure (7" W.C.).

The present invention is intended to be used in all types of systems and at all pressures from low to very high, as described above. And as used herein, the term "natural gas pipeline system" is intended to include all such factions of a system, from storage field or source through transmission lines, distribution lines and low-pressure applications.

Obviously, faults or leaks may occur in any portion of a natural gas pipeline system, and it is highly desirable, when utility maintenance teams are working on a given fault, to monitor the gas pressure. Normally, the gas pressure is monitored downstream of the work area because it is desired to maintain service while repairs are being made. The fault area is usually isolated from the rest of the system; and a by-pass or shunt is employed to route the gas around the fault after the fault area is isolated. This enables the system to continue to transmit or distribute the gas while the fault is being corrected. It is thus important that maintenance crews be alerted to high pressure (for safety reasons) as well as low pressure (to maintain service).

There are a number of shortcomings with existing, commercial pressure monitors. Primarily, the most common portable pressure monitors have a display which presents, in visual form, a reading representative of the pressure, in pounds per square inch (PSI) or inches of water column (W.C.), of the gas being monitored. These instruments are sufficiently accurate to be useful, but they require constant or repeated monitoring at short intervals to detect variances from a desired range. This distracts from the work crew's primary objective-namely, to repair the fault. Moreover, little or no warning is provided in the case of a pressure surge when these instruments are not being immediately attended by a workman. Further, if the monitor simply displays a reading, the operator must be constantly aware of the safe limits for the particular section of the network in which the work area is located. The possibility for human error is thus present even if the readings are accurate and regularly monitored.

SUMMARY OF THE INVENTION

The present invention provides a portable gas pressure monitor which includes a pressure sensor which may be coupled to a pipeline tap, preferably downstream of the area being worked upon. The pressure sensor generates an analog signal representative of the pressure at the tap location.

The electrical pressure signal is coupled to first and second electrical comparator circuits. Each comparator circuit receives a second, reference signal. One of the reference signals is representative of a desired high pressure set point, and the other is representative of a desired low pressure set point. The pressure range between the low pressure set point and the high pressure set point is a range of acceptable or safe gas pressures, and if the sensed pressure at the tap remains within the desired range, then no alarm signals are generated.

However, if the sensed gas pressure exceeds the high set point level, on the one hand, or falls below the low set point level on the other, distinctly different audible alarms are generated so that the operator knows immediately whether he or she is faced with a high pressure condition or a low pressure condition.

The two reference signals representative of the high pressure set point and the low pressure set point are programmable in the sense that they may be independently set by the operator. Thus, the monitor has widespread use over the various pressures found in a large natural gas pipeline system; and the apparatus is self-sufficient in that it may be battery-operated, easily-transported to any work site and readily installed. The monitor of the present invention is reliable and very useful in the field, particularly in emergency situations in which constant monitoring is required to maintain system integrity. The monitor also contains a visual display of the pressure so that the operator has immediate and accurate information on the pressure level with which he or she is dealing.

Other features and advantages of the present invention will be apparent to persons skilled in the art from the following detailed description of a preferred embodiment accompanied by the attached drawing wherein identical reference numerals will refer to like parts in the various views.

DETAILED DESCRIPTION OF A PREFERRED EMBODIMENT

Figure 1:
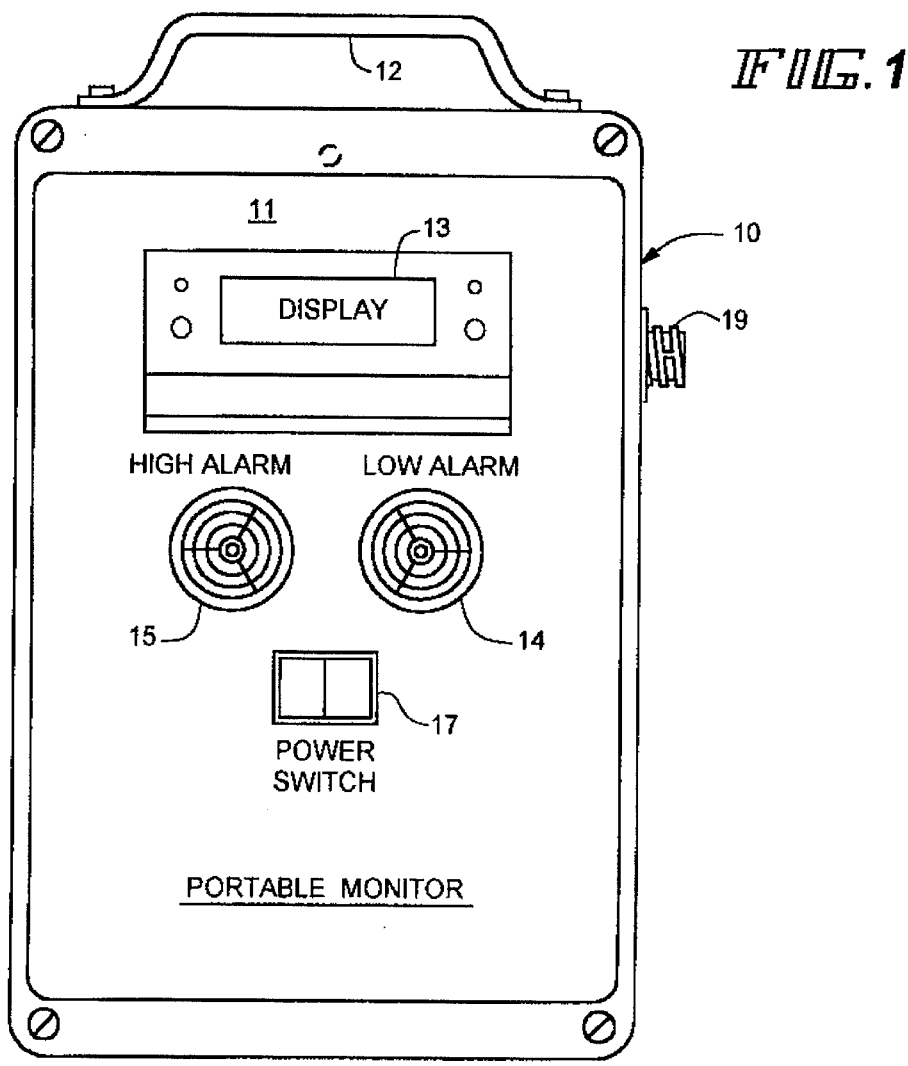
FIG. 1 is front view of the face panel of a portable monitor constructed according to the present invention.

Referring first to FIG. 1, reference numeral 10 designates a housing or casing for a portable gas pressure monitor which includes a faceplate panel 11 and an upper handle 12 secured to the top of the casing 10. On the face plate panel 11 there is a visual display 13, preferably a digital display, for displaying a reading representative of the gas pressure being monitored. There is also mounted on the face plate panel 11, a sound transducer or speaker 14 for a low alarm audible signal, and a corresponding speaker 15 for a high alarm audible signal or alarm.

There is also a power switch 17 located on the face plate panel 11. There is also a connector 19 mounted on the side of the housing 10 for receiving a mating connector 20 of a multiple-conductor electrical cable 21 (see FIGS. 3 and 4). At the other end of the electrical cable 21 there is a second connector 22 which couples to an output connector 23 of a conventional pressure transducer 24, available under the names Ashcroft or GP50, both known to persons skilled in this field. One end of the housing of the pressure transducer 24 is externally threaded, as designated at 26 in FIG. 4.

Figure 3:
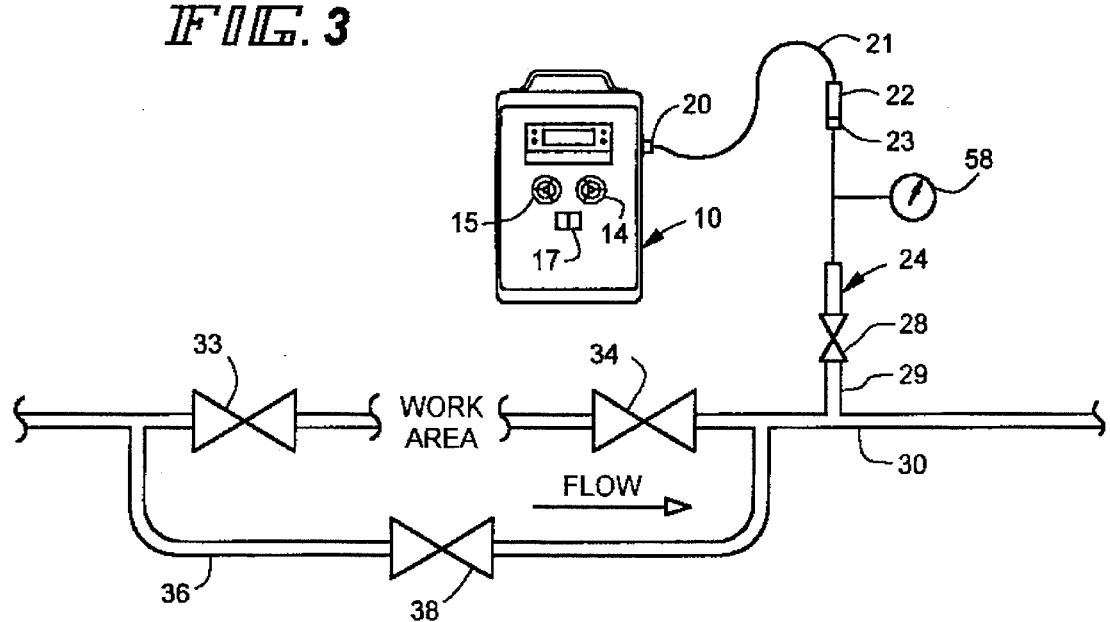
FIG. 3 is a diagrammatic view of a portion of a gas distribution network illustrating how the monitor of FIG. 1 may be used.

The threaded portion 26 of the transducer 24 is adapted to be threaded into a section of pipe which, in turn is coupled to one end of a valve 28 (FIG. 3). Valve 28 is connected to a tap 29 coupled to the section of a pipeline line under test, designated 30, at a downstream location. The line 30 could be a transmission line or a distribution line, or, as mentioned, a tap coupled to a storage field or source.

Referring to FIG. 3, then, the section of the main distribution line at which repair or maintenance work is needed is generally designated the "Work Area" in FIG. 3. The Work Area is isolated by means of an upstream shut-off valve 33 and a downstream isolation valve 34 connected respectively before the work area and behind the work area in the main distribution line 30, with reference to the direction of flow of the gas, which is designated by an arrow in FIG. 3. A shunt line 36 is routed from a location in the distribution line 30 upstream of the shut-off valve 33, and re-coupled to the main distribution line at a location downstream of the isolation valve 34. Another shut-off valve 38 is included in the shunt line 36 so that gas pressure can be controlled in the downstream section of the line 30, as necessary, for example, for installing the tap 29. In this way the work area is isolated from the operative sections of the distribution line, while the shunt 36 permits the distribution company to maintain service to its customers while the work in the Work Area is being completed.

Figure 4:
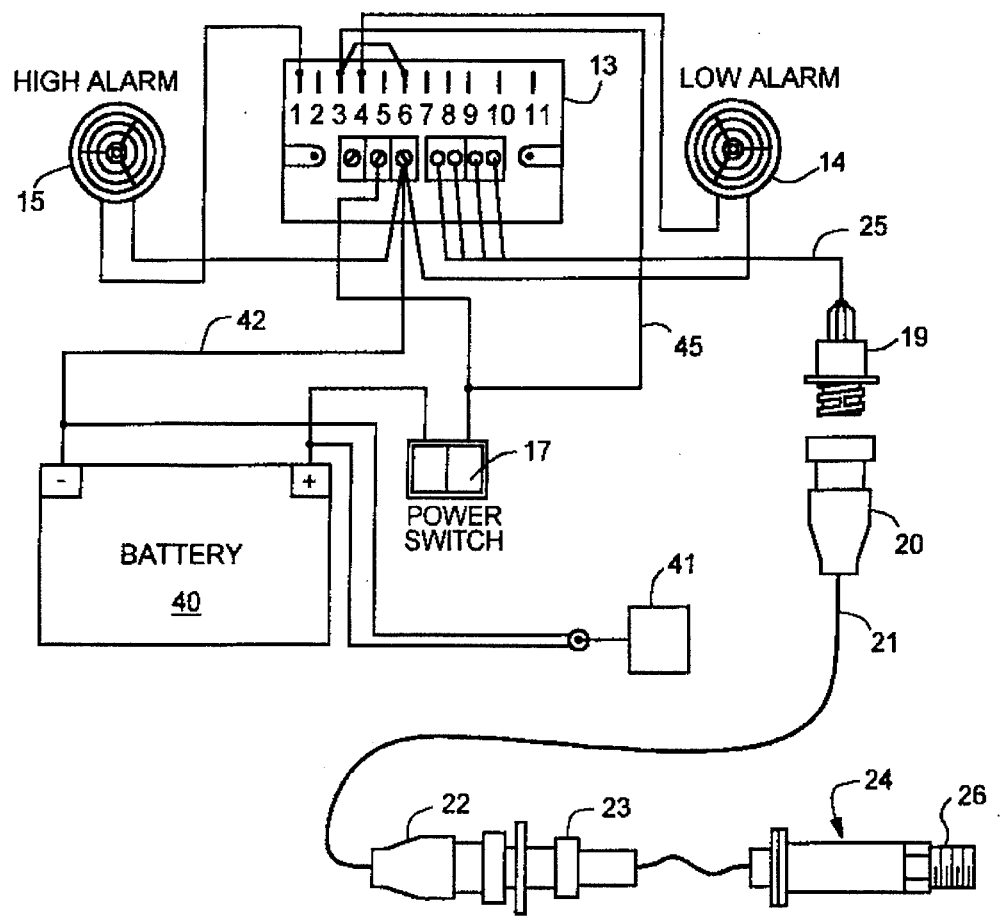
FIG. 4 is a wiring diagram for the monitor of FIG. 1.

Referring now to FIG. 4, electrical energy is provided by a rechargeable battery 40, to the terminals of which there may be connected a charging transformer 41. The power switch 17 is connected in series with the power line leading from the positive terminal of the battery 40; and the negative terminal of the battery 40 is directly connected to a ground terminal via lead 42 on the rear side of the LED display 13.

Figure 2:
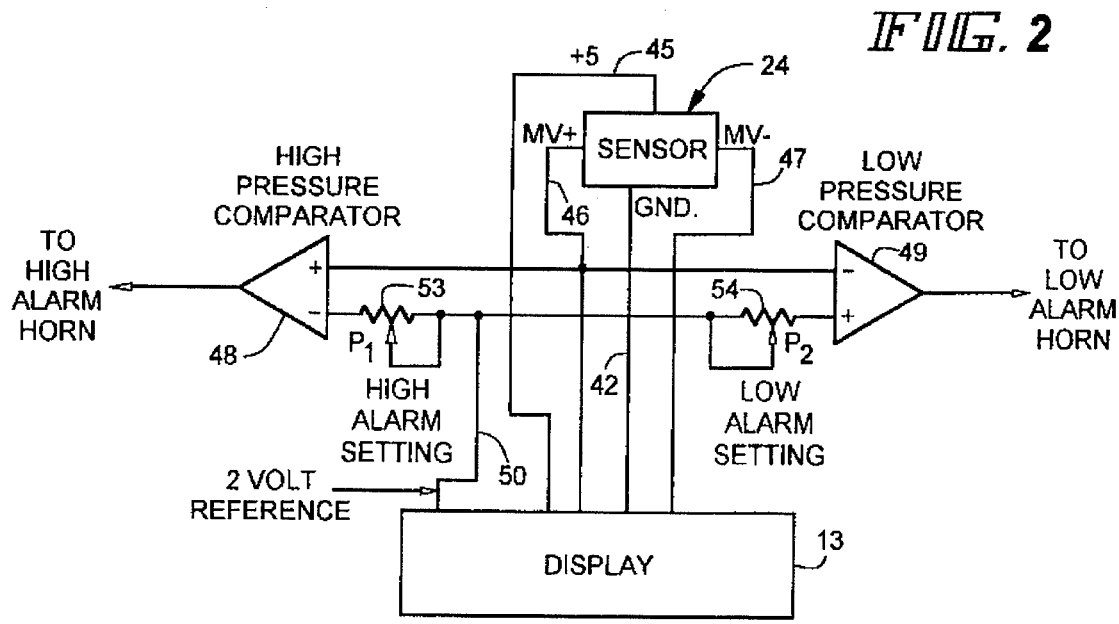
FIG. 2 is an electrical circuit schematic diagram for the monitor of FIG. 1.

Although others may equally well be used, I have found that the LED display manufactured by Newport Electronics, Model D96015 is satisfactory for purposes of the present invention. One terminal of each of the low alarm speaker 14 and high alarm speaker 15 are also connected to the negative terminal of the battery at the rear panel of the display 13. The multiple-conductor cable 25 which connects the connector 19 to the display 13 includes four separate leads. Turning now to FIG. 2, these leads include a positive voltage line from the battery, designated 45, a ground lead 42, and first and second signal leads designated respectively 46 and 47 in FIG. 2. The signal leads are the output signal of the pressure transducer 24. The signal on the lead 46 is connected to the positive input of a high pressure electrical comparator circuit 48 as well as to the negative signal input of a low pressure comparator circuit 49.

A constant voltage reference signal is coupled to a lead 50 and connected to a first variable resistor 53 connected in series with the negative input of the high pressure comparator 48, as well as a second variable resistor 54 connected in series with the positive signal input of the low pressure comparator 49.

Thus, the output signal of the sensor is an analog signal representative of the pressure sensed by the transducer 24 in the tap 29 with the valve 28 open. This signal may be checked, upon initiation of the monitor in a work area, by means of a calibrated gauge 58 (FIG. 3) connected to the signal lead between the transducer 24 and the transducer connector 23.

When the output signal of the sensor on line 46 exceeds the reference signal on the negative input of the high pressure comparator 48, a signal is generated at the output of the comparator 48 to energize the high pressure alarm speaker 15. The high pressure alarm may include a circuit for generating a tone (or, if desired, an intermittent signal) which is distinctly different from that generated by the low pressure alarm speaker 14. Such devices are commercially available. The variable resistor 53 may be adjusted by the operator, and it may include a calibrated dial, for setting the high pressure set point or upper limit of a safe or acceptable operating pressure range.

The reference signal coupled through the variable resistor 54 to the positive input of comparator 49 represents a low set point (or limit or threshold) for the desired operating range so that if the signal on line 46 from the sensor at the negative input of the low pressure comparator 49 falls below the low pressure threshold setting determined by variable resistor 54, the output of transducer 49 energizes the low pressure transducer 14. As long as the sensed pressure signal from the sensor 24 is above the low set point determined by the setting of variable resistor 54 and below the high set point determined by the setting of variable resistor 53, no audible alarm is generated. In all cases, however, the actual value of the pressure is displayed on the display 13.

It will thus be observed that the operator may conveniently and independently set either the high pressure set point (by means of the variable resistor 53) or the low pressure set point (by adjusting resistor 54); and this is considered an important feature of the invention. In any case, the operator is immediately alerted as to the nature of the alarm condition due to the different audible signals representing those conditions.

Having thus disclosed and illustrated one embodiment of the invention, persons skilled in the art will be able to modify certain of the elements which have been disclosed, such as the LED display and the particular details of the electronic sensing and measuring circuit, and to substitute equivalent components for those disclosed, such as the audible alarm transducers, while continuing to practice the principle of the invention; and it is, therefore, intended that all such modifications and substitutions be covered as they are embraced within the spirit and scope of the appended claims.

I claim:

1. Portable apparatus for monitoring the pressure of a gas in a distribution line downstream of a work area, comprising:

a pressure sensor adapted to be coupled to a tap in said distribution line located downstream of the work area for generating an electrical pressure signal representative of the pressure of said gas in said distribution line at said tap location;

a first manually adjustable reference circuit for generating a first reference signal representative of an upper set point of a desired safe operating range of pressure for said gas;

a first comparator circuit receiving said electrical pressure signal and first reference signal for generating a first output alarm signal when said electrical pressure signal exceeds said first reference signal;

a second reference circuit manually adjustable independent of said first reference circuit for generating a second-reference signal representative of a lower set point of said desired safe operating range of pressure for said gas whereby the high and low set points of an acceptable operating range for the gas pressure monitor may be independently adjusted by the operator;

a second comparator circuit receiving said electrical pressure signal and said second reference signal for generating a second output alarm signal when said electrical pressure signal is lower than said second reference signal;

an audible alarm means responsive to either one of said first and second output alarm signals for generating an audible alert sound, and including a high pressure alarm connected in circuit with said first comparator circuit, and a low pressure alarm connected in circuit with said second comparator circuit, and characterized in that said first and second alarms generate readily discernable and distinctive audible signals, wherein an operator may be immediately alerted by the audible signal as to whether the pressure being monitored is higher than the desired operating range or lower than the desired operating range by the audible signal generated by the monitor circuit.

* * * * *